US009376288B2

(12) United States Patent
Satola

(10) Patent No.: US 9,376,288 B2
(45) Date of Patent: Jun. 28, 2016

(54) REELING APPARATUS FOR COILING TUBES

(75) Inventor: Jouni Satola, Chachoengsao (TH)

(73) Assignee: Luvata Espoo Oy, Espoo (FI)

( * ) Notice: Subject to any disclaimer, the term of this patent is extended or adjusted under 35 U.S.C. 154(b) by 339 days.

(21) Appl. No.: 14/113,328

(22) PCT Filed: Apr. 28, 2011

(86) PCT No.: PCT/EP2011/056779
§ 371 (c)(1), (2), (4) Date: Dec. 13, 2013

(87) PCT Pub. No.: WO2012/146293
PCT Pub. Date: Nov. 1, 2012

(65) Prior Publication Data
US 2014/0145023 A1 May 29, 2014

(51) Int. Cl.

| | |
|---|---|
| ***F16K 3/36*** | (2006.01) |
| ***B65H 54/34*** | (2006.01) |
| ***B21C 47/10*** | (2006.01) |
| ***B65H 54/56*** | (2006.01) |
| ***B65H 54/80*** | (2006.01) |
| ***B08B 9/032*** | (2006.01) |

(52) U.S. Cl.
CPC ............ *B65H 54/343* (2013.01); *B08B 9/0328* (2013.01); *B21C 47/10* (2013.01); *B65H 54/56* (2013.01); *B65H 54/80* (2013.01); *B65H 2301/5115* (2013.01); *B65H 2701/331* (2013.01); *Y10T 137/4245* (2015.04)

(58) Field of Classification Search
CPC ................... Y10T 137/4259; Y10T 137/4245; B65H 54/343; B65H 54/56; B65H 54/80; B65H 2301/5115; B65H 2701/331; B21C 47/10; B08B 9/0328
See application file for complete search history.

(56) References Cited

U.S. PATENT DOCUMENTS 2,893,652 A 7/1959 Davis
3,042,336 A * 7/1962 Krafft .................... B21C 47/10 242/362
4,280,672 A * 7/1981 Santos .................. A62C 33/02 15/40

(Continued)

FOREIGN PATENT DOCUMENTS

DE 1082215 B 5/1960
GB 838424 A 6/1960
JP 53037914 A 4/1978

(Continued)

*Primary Examiner* — Jessica Cahill
(74) *Attorney, Agent, or Firm* — Hodgson Russ LLP

(57) ABSTRACT

The invention relates to a reeling apparatus (1) and a method for coiling a tube using the apparatus. The apparatus is config ¬ured to coil a tube (5), and comprises a main reel (2) connected to a spindle (3) and configured to rotate around a central axis (C), a tube holding ring (4) configured to rotate together with the main reel and to collect an initial part of the tube, a guide ele¬ment (6) at a distance (d2) from the main reel to guide the tube to the apparatus. The tube holding ring is located outside and at a radial distance (d1) from the main reel with respect to the cen¬tral axis, and the guide element is movable between an outer position (A) for guiding the tube to be coiled onto the tube hold¬ing ring, and an inner position (B) for guiding the tube to be coiled onto the main reel.

18 Claims, 5 Drawing Sheets

(56) References Cited

U.S. PATENT DOCUMENTS

| | | | | |
|---|---|---|---|---|
| 2005/0236043 | A1* | 10/2005 | Zhurin | E03B 7/12<br>137/240 |
| 2007/0051649 | A1* | 3/2007 | Carroscia | B23K 9/133<br>206/409 |

FOREIGN PATENT DOCUMENTS

| | | | |
|---|---|---|---|
| JP | 61135854 | | 8/1986 |
| JP | 63270414 | | 11/1988 |
| JP | 4-159967 | A | 6/1992 |
| JP | 7-267496 | A | 10/1995 |
| JP | 1046255 | | 2/1998 |

* cited by examiner

REELING APPARATUS FOR COILING TUBES

FIELD OF THE INVENTION

The present invention refers to a reeling apparatus according to the characterized portion of claims 1. The present invention also refers to a method for coiling a tube according to the characterized portion of claim 9 and to the use of this method for cleaning a tube.

BACKGROUND OF THE INVENTION AND PRIOR ART

The manufacture of cables, wires and tubes is preferably done in a continuous process, whereby the cables, wires or tubes may be processed before or during coiling. Processing operations may entail covering the cable with a plastic jacket or annealing a tube, etc. It is important that the processing operations can be performed without interruption in order to maintain quality and to avoid imperfections. Furthermore, manufacturing costs per meter of tube will be lower if normal running conditions for the processing operations can be achieved within a short time after the first initial length of the cable, wire or tube merges from the processing apparatus. This first initial part of the cable, wire or tube is often imperfect and may need to be removed before transporting the coiled tube.

Many times the processing operation of the cable, wire or tube (hereinafter referred to as tube) is followed by a coiling or spooling process. The tube may be coiled in a reeling apparatus by coiling the tube around a rotating main reel or spool. The tube may be guided to the reeling apparatus in different ways. For example, by using a guide arm or guide element, positioned at the end of the production line, and in the proximity of the reeling apparatus, but at a distance from the main reel. The guide element is to guide the tube from the production line towards the main reel.

The initial part of the tube is often comprised of imperfect tube, which needs to be removed from the main or finished tube that is to be transported to a customer. Separation of the initial part of the tube may be achieved by introducing a flange on the reel or spool after coiling the imperfect initial part on the main reel. The tube is preferably coiled around the flange so that coiling may continue without interruption of the manufacturing process. At the end, or even during, the coiling process, the initial part of the tube may be removed e.g. by cutting.

For some applications, tubes need to be cleaned at the end of the operation process. Some countries require the inside of hollow tubes used in, for example, air conditioning systems to be substantially free of oil residuals. This cleaning of tubes may be achieved by purging the tube with a gas, preferably a hot gas such as nitrogen, during processing and/or coiling of the tube. This may be achieved by attaching a gas pipe to an end of the tube that has been processed. The gas can than flow through the tube while being processed and coiled.

Coiled tubes may have a length of several kilometers and a weight of hundreds of kilograms. In order to purge a gas through such a long tube, the gas must have a substantially high pressure. A relative high gas pressure can be used for tubes having a diameter that is not too small. However, when the diameter of the tubes becomes too small, the walls of the tube may rupture when the gas pressure becomes too high. This problem is solved by decreasing the length of the tube. For example, two or more coils can be manufactured, whereby each coil has a length and a weight, which is for example halve or one third of the original tube The two coils may be coiled and stacked on top of each other before being transported to a customer. The coiling of the first tube may be done in a conventional way, whereby the imperfect or flawed initial part of the tube is separated by coiling the flawed part of the tube under a flange on the main reel of the reeling apparatus. The remainder of the tube can then be coiled on top of the flange. Pressurized gas may be attached to the first tube by means of a connecting member. At the end of the first coiling process, the second tube may be processed by placing it on top of the first coil. The imperfect initial part of the second coil will arrive at the reeling apparatus and need to be collected and separated from the remainder of the coil. The gas pipe may then be attached to this second tube, and after this the coil can be wound on top of the first coiled tube. The initial part of the second tube will be located between the first coil and the second coil. The imperfect initial part needs to be removed prior to transportation. Flanges cannot be used because these will also need to be removed or separated before transportation. Lifting the heavy second coiled tube to remove the initial part and/or flanges is not a realistic option. The initial part of the second tube needs to be separated before the main part of the second tube is coiled on top of the first coil. This separation needs to be done during the continuous operation process of the second tube.

PRIOR ART

The prior art describes some apparatuses that can be used to separate initial parts of tubes from a main tube during coiling of said tube.

U.S. Pat. No. 3,625,448 describes a process for coiling cables, whereby an initial part of a cable is separated from the main part of a cable by guiding the imperfect part over a separate reel, which is located co-axial to the main reel. The cable is first attached inside the main reel, by means of a slot, and than coiled on the separate reel, until the unflawed cable arrives from the operation process. Then, a guiding means, comprising an eye on the separate reel through which the cable passes, guides the cable to the main reel by bending the cable. This process requires the cable to be flexible enough to be bend at almost 180°. The coiled cable is removed by first removing the main reel. Then the initial part of the cable can be removed from the separate reel.

GB 902712 also describes a process and a machine for coiling wires, whereby the initial part of the wire is separated from the main wire by coiling the initial part of the wire on a separate and co-axial reel. The wire is attached to the separate reel. When the good wire arrives, the wire is guided to the main reel over a flange using a guiding means placed outside the apparatus that moves the wire axially from the separate reel to the main reel. A pin on the separating flange is use to 'catch' the wire on the flange, where after the wire is coiled on the main reel. Again, the wire is first removed by removing the main reel. Then, the initial part of the wire can be removed from the separate reel.

U.S. Pat. No. 3,620,482 describes an apparatus having a separate reel mounted coaxially on a main reel, whereby the reels are separated by a flange. The wire is attached to the separate reel and guided by means of straps attached to a traverse machine. This apparatus also uses flanges. The guiding means loop the wire from the reeling apparatus back to the traverse machine before coiling the wire on the reels. The wire must be flexible enough to be looped at an almost 180° angle.

These apparatus are not suitable for separating an initial part of a second tube during an operation process, whereby the tube is coiled and stacked on a first coiled tube. As explained above, the use of flanges is preferably avoided. Attaching a gas pipe to the tube seems nearly impossible in these constructions. Further, the apparatus of the prior art are horizontally orientated, while the coiling and stacking of the tube of the present invention is preferably done using a vertically orientated apparatus. Bending a tube may not always be possible.

SUMMARY OF THE INVENTION

The object of the present invention is to develop a reeling apparatus and a method, whereby an initial part of a tube can be separated from the remaining part of the tube during an operation process in such a way that the initial flawed part is wound in such a way that it can be easily separated from the remaining tube, and also allowing another operation at the same time, such as purging.

Another object is to provide a solution that is relatively simple to construct, preferably through an adjustment of an existing coiling apparatus.

Another object is to provide an apparatus, whereby the tube does not need to be attached to the reel before coiling and whereby no slots, pins and traverse machines are needed to coil the tube on a reel.

A further object is to provide an apparatus, whereby the initial part of the tube can be easily separated and removed.

Yet a further object is to provide an apparatus, whereby a connecting member can be attached to the tube in order to purge gas through the tube during processing and coiling of the tube.

The objects are achieved by the apparatus initially defined and characterized in that the tube holding ring is located outside and at a radial distance from the main reel with respect to the central axis, and the guide element is movable between an outer position for guiding the tube to be coiled onto the tube holding ring, and an inner position for guiding the tube to be coiled onto the main reel. The tube holding ring can be mounted on an existing reeling apparatus. The construction of the ring may be relatively simple as well.

A connecting member can be attached to the end of the tube when to tube arrives at the tube holding ring. The coiling can then start and when the unflawed tube arrives, the guide element simply moves the tube to the inner position so that the tube can be coiled in the main reel.

In one embodiment, there is an annular interspace between the main reel and the tube holding ring. Such annular space facilitates the transport of the tube from the tube holding ring to the main reel.

In another embodiment, a moving member is used to move the guide element between the outer and inner position. Such moving member may be located outside the reeling apparatus. The moving member will facilitate the movement of the guide element. The movement may even be by automated using a computer controlled process or programable controller.

In a further embodiment, the apparatus comprises a connecting member configured to be attached to the end of the tube to be coiled. In one embodiment, the connecting member is attached to a gas reservoir. The connecting member provides a flexible means for connecting the pressurized gas reservoir to the tube. In another embodiment, the connecting member is attached to an end of the tube such that gas can be purged from the reservoir through the tube. The connecting member may or may not rotate during coiling of the tube. In another embodiment, the connecting member is rotatably connected to the end of the tube.

In an alternative embodiment, the central axis is extended vertically.

The objects are also achieved with the method initially defined and characterized in that the method comprises the steps of;—rotating a main reel and a tube holding ring around the central axis;—receiving a tube from a guide element into the tube holding ring;—coiling an initial part of the tube in the tube holding ring;—moving the position of the guide element in respect to the central axis from an outer position to an inner position when the unflawed tube arrives from the guide element; and—coiling the tube on the main reel. This method can be used in a continuous process. No interruptions of the process are necessary. The tube does not need to be attached in slots or pins, nor does the tube need to be bend to separate the initial part of the tube from the rest of the tube.

In one embodiment, a connecting member is attached to an end of the tube before coiling the initial part of the tube in the tube holding ring. The process may be interrupted or slowed down to separate the flawed or initial part of the tube before coiling the main part of the tube.

In another embodiment, the initial part of the tube is cut after after coiling the second tube (5). A package comprising two or more coils stacked on top of each other can be transported to the customer.

In a further embodiment, a gas is purged through the tube.

In yet another embodiment, gas is purged through the tube during the entire coiling process. A tube can be cleaned to remove oil residuals from inner surface of the tube using different gases. Removal of oil residuals can effectively be done by using nitrogen gas. In an alternative embodiment, the gas is nitrogen.

Tubes like copper tubes may be annealed before being coiled. The initial part of such a tube is hard and needs to be separated from the soft annealed remainder of the tube. In one embodiment, non-annealed tube is coiled in the tube holding ring and annealed tube is coiled on the main reel.

The method of the present invention is especially useful for processing and coiling of tubes with a diameter below 15 mm. Rupture of such tubes can be prevented by shortening the length of the coil and using the method of the present invention.

In another embodiment, the tube has a diameter below 15 mm.

The new method is suitable for coiling two or more coils on top of each other because no flawed initial part of the tubes will be placed between the stacked coils.

In a further embodiment, the tube is coiled on top of a first coiled tube.

The present invention also relates to a use of the method described above for cleaning tubes.

BRIEF DESCRIPTION OF THE DRAWINGS

The invention will now be explained more closely by means of a description of various embodiments and with reference to the drawings attached hereto.

DETAILED DESCRIPTION OF

Figure 1:
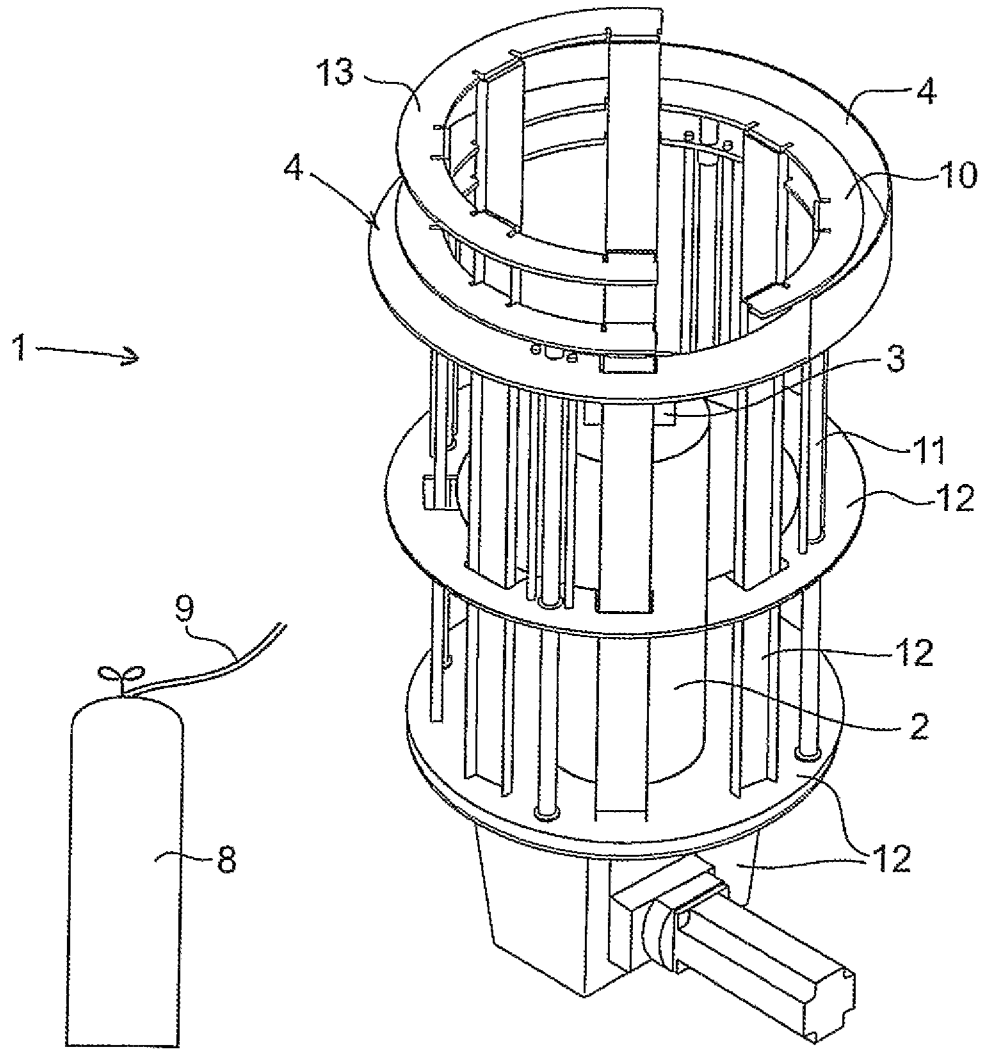
FIG. 1 shows the reeling apparatus and the tube holding ring.
Figure 3:
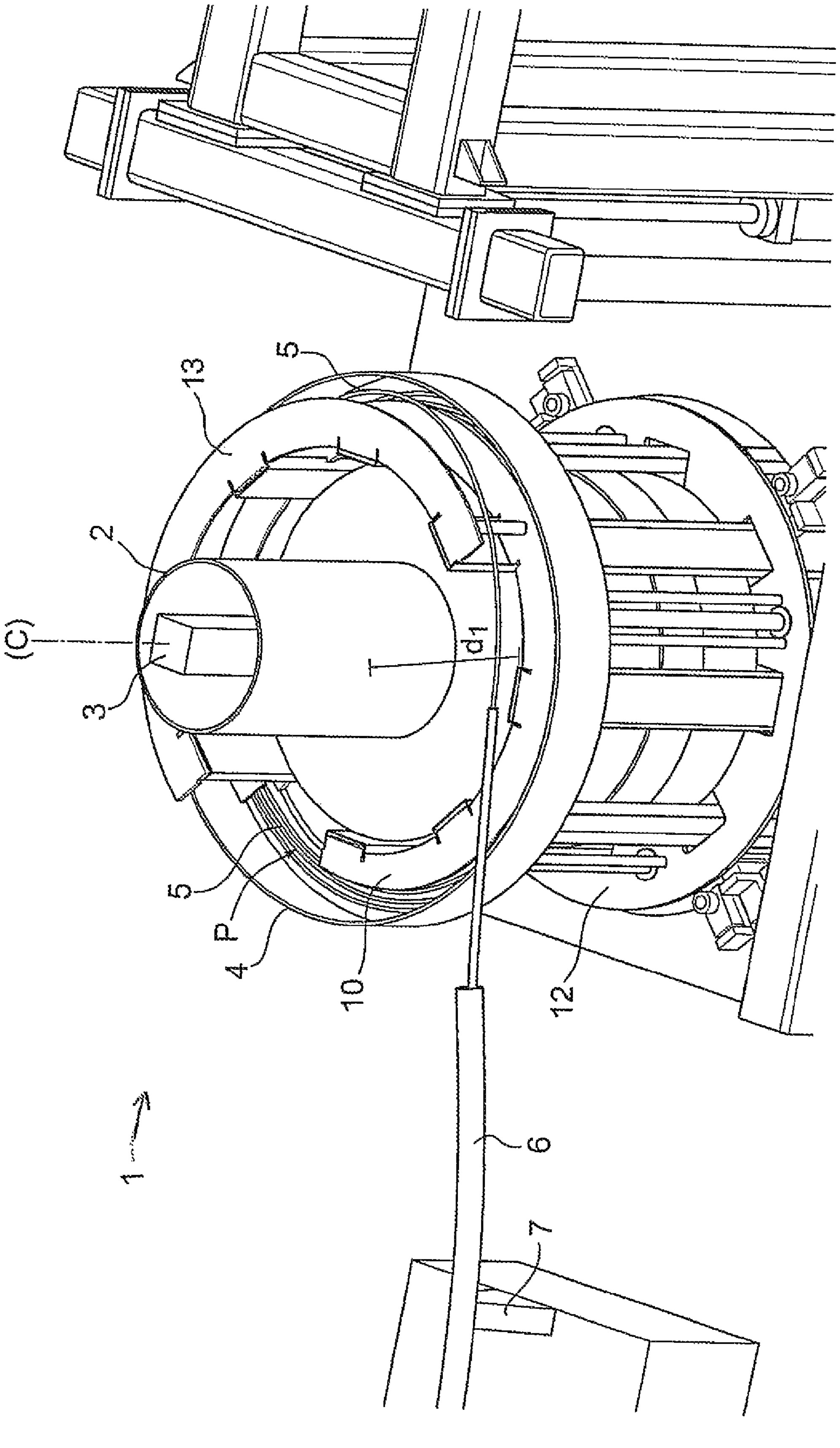
FIG. 3 shows the reeling apparatus and the guide element during coiling of the tube on the tube holding ring.
Figure 4:
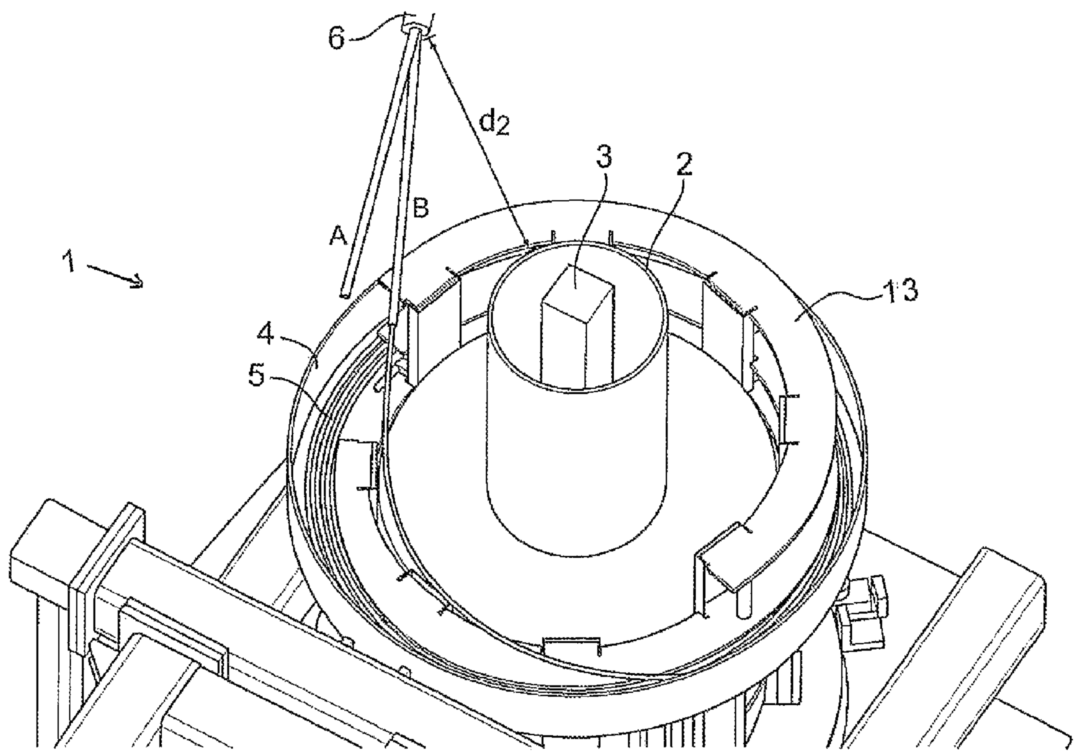
FIG. 4 shows the reeling apparatus whereby the guide element is being moved from position A to position B.

FIGS. 1 and 3 show an apparatus 1, whereby a central axis C is extended vertically. A main reel 2 is connected to a spindle 3 of the apparatus 1. The main reel 2 is attached to spindle 3 by attaching means (not shown) and configured to be rotated around the central axis C. The central axis C may be extended in a different direction.

Figure 2:
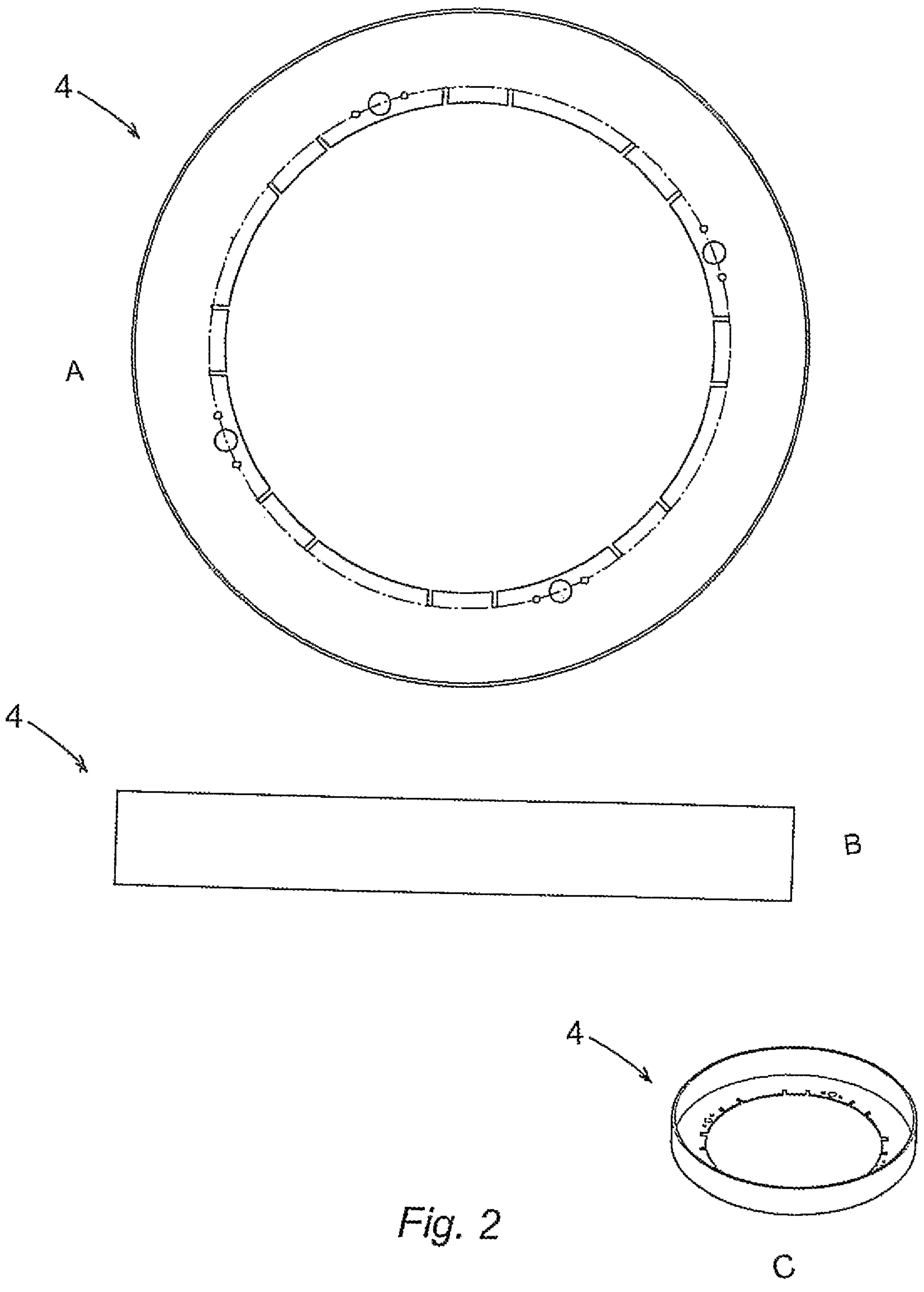
FIG. 2 shows a top, side and 3D view of the tube holding ring.
Figure 5:
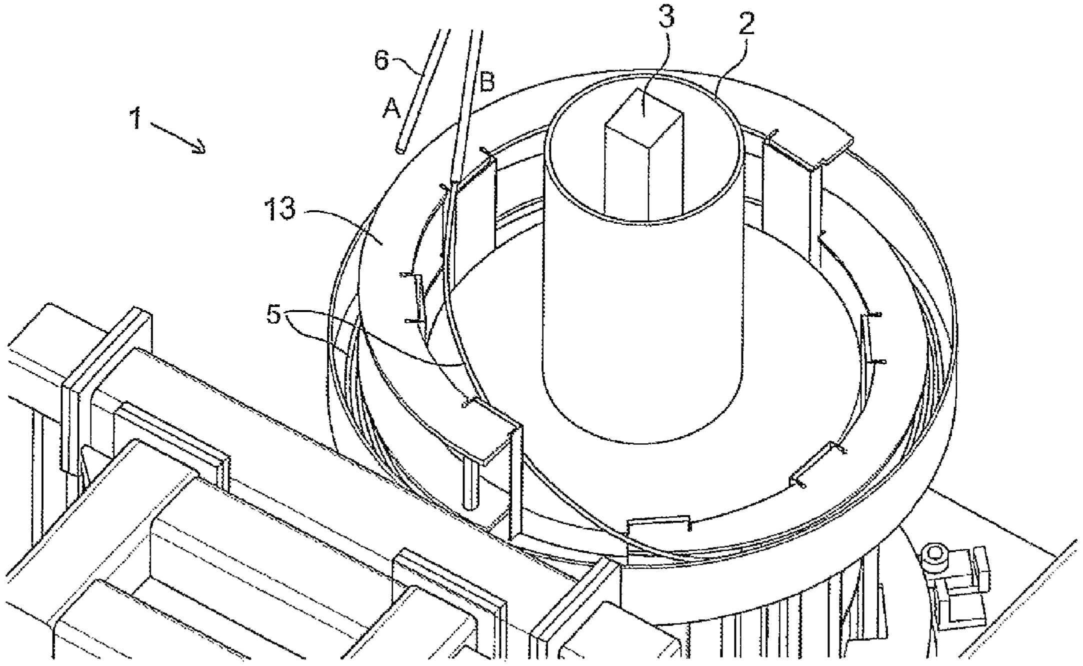
FIG. 5 shows the reeling apparatus, whereby the guide element is in position B and the coiling starts on the main reel.
Figure 6:
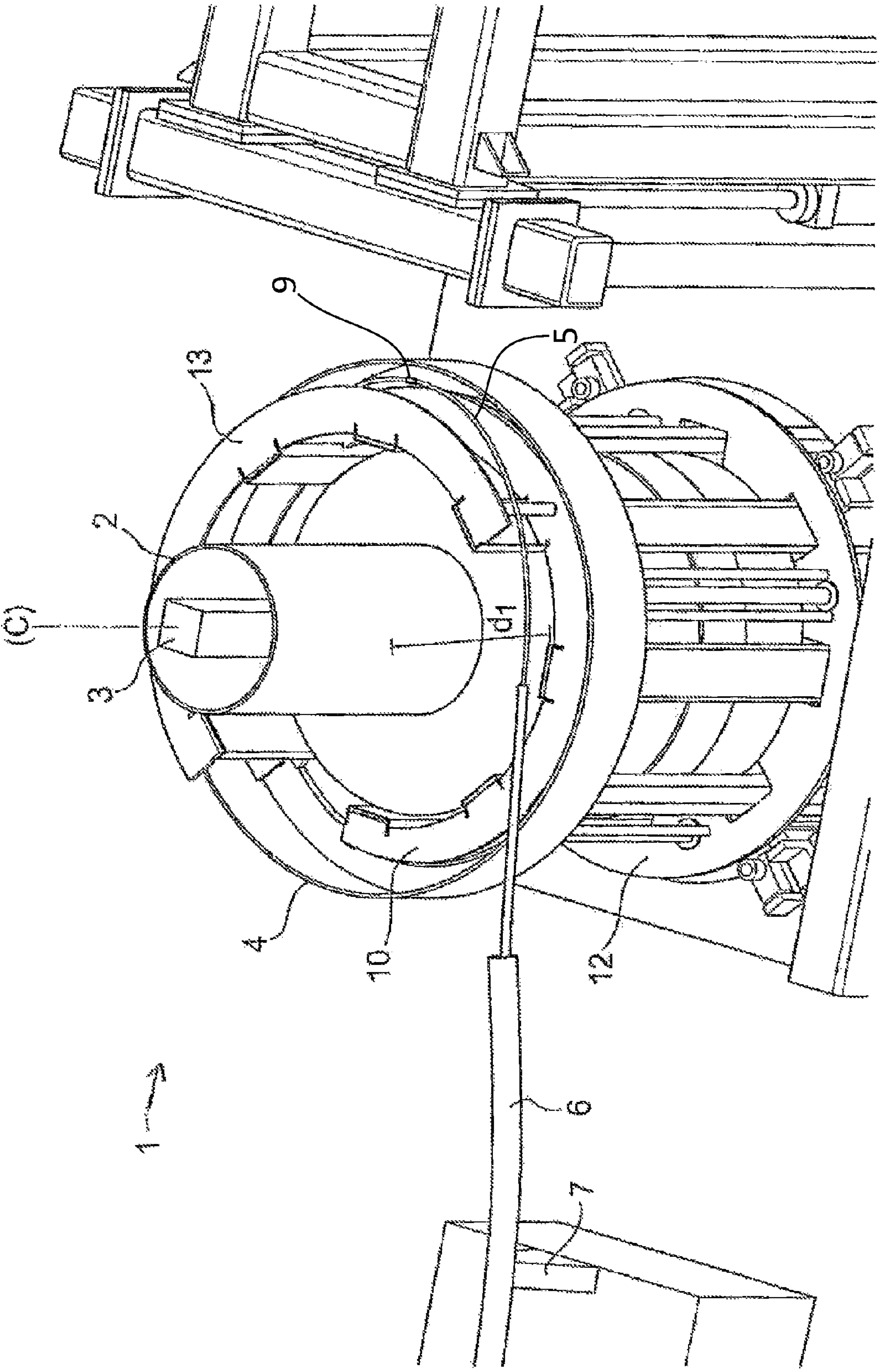
FIG. 6 shows the reeling apparatus and the guide element during coiling of the tube on the tube holding ring with the connecting member.

As shown in FIG. 3 a tube holding ring 4 is located outside and at a radial distance d1 from the main reel 2 with respect to the central axis C. The tube holding ring 4 is configured to rotate with the main reel 2. FIG. 2 shows the tube holding ring 4 from above (A), the side (B) and a 3D view (C). The tube holding ring 4 may collect an initial part of a tube 5 in the open space over the tube holding ring 4. An annular interspace P shown in FIG. 3 between the main reel 2 and the tube holding ring 4 provides the space needed to move the tube 5 from the tube holding ring 4 to the main reel 2. An inner ring 10 may be present to hold the tube 5 in the tube holding ring 4. A half circle 13 on top of the reeling apparatus 1, which is part of a construction 12 of the apparatus 1, may be provided to assist in moving the tube 5 from an outer position A to an inner position B as shown in FIG. 5. The tube holding ring 4 may be constructed in such a way that it can move up and down along the central axis C. Hydraulic lifting means 11 may be used for this function. This way, the tube holding ring 4 can move along the central axis C during coiling as the height of the coiled tube 5 extends along the central axis C.

A guide element 6 is positioned at a distance d2 from the main reel 2 with respect to the central axis C. The guide element 6 is configured to guide the tube 5 to the apparatus 1. The guide element 6 is movable between an outer position A for guiding the tube 5 to be coiled onto the tube holding ring 4, and an inner position B for guiding the tube 5 to be coiled onto the main reel 2.

The guide element 6 comprises a moving member 7 (symbolically shown in FIG. 3), which is used to move the guide element 6 between the outer and inner position A, B. The moving member 7 may be any means used to move the guide element 6, such as a hydraulic or a pneumatic cylinder.

If a gas such as nitrogen gas is to be purged through the tube 5, a connection needs to be established between the tube 5 and a pressurized gas reservoir 8. This connection can be made by using a connecting member 9. This connecting member 9 may be any means to connect the end of the tube 5 to the reservoir 8 such as a clamp attached to a pipe. Preferably, the connecting member 9 is flexible so that it can rotate with the tube 5 during coiling of the tube 5.

The present invention also relates to a method for coiling a tube 5. The operation process (not shown) for annealing a tube 5 may start with placing the tube 5 in a basket. From the basket, the tube 5 first passes pinch rollers as part of a straightener unit before the tube 5 is introduced into an annealer. Inside the annealer, the tube 5 is heated with help of induction coils to make the tube 5 soft. After annealing, the tube 5 passes a dwelling zone where the tube 5 is cooled with water and air-wiped to dry. After passing a tensioner, the tube 5 is fed with help of the guide element 6 to the reeling apparatus 1.

When the tube 5 is to be purged with a gas, the end of the tube 5 may be connected to the gas reservoir 8 using the connecting member 9. The gas reservoir 8 is preferably stationary and located at a distance from the reeling apparatus 1. The connecting member 9 may be attached to an end of the tube 5 before coiling the initial part of the tube 5. The gas will flow in the opposite direction of the operation process and contaminations such as oil residuals evaporate at the other end of the tube 5. The gas may be purged through the tube 5 during the entire coiling process.

The initial part of the first tube (coil) 5 comprises hard un-annealed tube 5 and can be separated by coiling this initial part under a flange (not shown). When the soft tube 5 arrives at the reeling apparatus 1, the tube 5 is coiled on the flange. After coiling the first tube 5, the second hard un-annealed tube 5 arrives at the reeling apparatus. The connecting member 9 may be attached to the tube 5. The guide element 6 is first positioned at an outer position A to guide the tube 5 into the tube holding ring 4. The initial part of the tube 5 is then coiled in the tube holding ring 4. This initial part of the tube 5 may have a length of about 20 to 30 m. Once the soft annealed tube 5 arrives at the reeling apparatus 1, the guide element 6 moves from the outer position A to the inner position B. For this purpose a computer program may be used, which activates for example a pneumatic cylinder that pushes the guide element 6 to the inner position B. The moment of activation may be predetermined and for example depend on the number of rotations of the spindle 3. Also, the angle by which the guide element 6 moves in relation to the central axis C can be predetermined.

The soft annealed tube 5 can then be coiled on top of the first coil. After coiling the second tube 5, the connecting member 9 can be removed and the stacked and coiled tubes 5 can be removed from the reeling apparatus 1 and transported to the customer.

Using the reeling apparatus 1 as described above the method may comprise the steps of;

rotating the main reel 2 and tube holding ring 4 around the central axis C;

receiving the tube 5 from the guide element 6 into the tube holding ring 4;

coiling the initial part of the tube 5 in the tube holding ring 4;

moving the position of the guide element 6 in respect to the central axis C from an outer position A to an inner position B when the unflawed tube 5 arrives from the guide element 6;

coiling the tube 5 on the main reel 2.

The good or unflawed tube 5 is defined as the main part of the tube 5 without the imperfections of the initial part of the tube 5. In other words, the unflawed tube 5 is the part of the tube 5 that is to be transported to the customer.

Although not necessary, the connecting member 9 may be disconnected from the tube 5 after the coiling the initial part of the tube 5 in the tube holding ring 4. The production line may be stopped and the initial part of the tube 5 may then be separated from the rest of the tube 5, for example by cutting the tube 5. The connecting member 9 may then be attached to the tube 5 again before coiling the annealed (good) tube 5 on the main reel 2.

The method of the present invention is especially suitable for small tubes 5, such as for example copper tubes 5 with a diameter below 20 mm or below 15 mm or below 10 mm or below 8 mm. The diameter of the tube 5 may be between 2 to 20 mm. The wall thickness of the tube 5 may be around 0.10 to 1.0 mm, or below 0.7 mm or below 0.5 mm, or below 0.3 mm.

The length and weight of the tube 5 will depend on material of the tube and the diameter and wall thickness of the tube 5 to be coiled. As an example only, a copper tube 5 may have a length between 2 and 50 km or below 10 km or below 7 km and a weight between 100 to 1000 kg or below 500 kg or below 400 kg for a tube 5 having a diameter between 2 and 20 mm or below 15 mm.

The method can advantageously be used for cleaning tubes 5, especially for cleaning tubes 5 from oil residuals. The tube 5 that has been coiled and purged as described above may comprise less than 0.2 or 0.1 mg oil residuals per meter inside the tube 5.

The invention claimed is:

1. A reeling apparatus configured to coil a tube on a main reel, whereby the apparatus comprises the main reel connected to a spindle of the apparatus and configured to be rotatable around a central axis, a tube holding ring configured to rotate together with the main reel and to collect an initial part of the tube, and a guide element positioned at a distance from the main reel with respect to the central axis, and configured to guide the tube to the apparatus characterized in that the tube holding ring is located outside and at a radial distance from the main reel with respect to the central axis, and the guide element is movable between an outer position for guiding an initial flawed part of the tube to be coiled onto the tube holding ring, and an inner position for guiding an unflawed part of the tube to be coiled onto the main reel, wherein the tube holding ring is configured to translate along the central axis with respect to the main reel.

2. The reeling apparatus according to claim 1, characterized in that there is an annular interspace between the main reel and the tube holding ring.

3. The reeling apparatus according to claim 1, characterized in that a moving member is used to move the guide element between the outer and inner position.

4. The reeling apparatus according to claim 1, characterized in that the central axis is extended vertically.

5. The reeling apparatus according to claim 1, characterized in that the apparatus further comprises a connecting member configured to be attached to the end of the tube to be coiled.

6. The reeling apparatus according to claim 5, characterized in that the connecting member is rotatably connected to the end of the tube.

7. The reeling apparatus according to claim 5, characterized in that the connecting member is attached to a gas reservoir.

8. The reeling apparatus according to claim 7, characterized in that the connecting member is attached to an end of the tube such that gas can be purged from the reservoir through the tube.

9. A method for coiling a tube using the reeling apparatus according to claim 1, characterized in that the method comprises the steps of;

rotating the main reel and the tube holding ring around the central axis;

receiving the tube from the guide element into the tube holding ring;

coiling an initial flawed part of the tube in the tube holding ring;

moving the position of the guide element in respect to the central axis from an outer position to an inner position when the unflawed tube arrives from the guide element; and coiling the tube on the main reel.

10. The method according to claim 9, characterized in that the initial part of the tube is cut after coiling the second tube.

11. The method according to claim 9, characterized in that non-annealed tube is coiled in the tube holding ring and annealed tube is coiled on the main reel.

12. The method according to claim 9, characterized in that the tube has a diameter below 15 mm.

13. The method according to claim 9, characterized in that the tube is coiled on top of a first coiled tube.

14. Use of the method according to claim 9 for cleaning tubes.

15. The method according to claim 9, characterized in that a connecting member is attached to an end of the tube before coiling the initial part of the tube in the tube holding ring.

16. The method according to claim 15, characterized in that a gas is purged through the tube during the entire coiling process.

17. The method according to claim 15, characterized in that a gas is purged through the tube.

18. The method according to claim 17, characterized in that the gas is nitrogen.

* * * * *